(12) United States Patent
Taniuchi et al.

(10) Patent No.: US 8,406,824 B2
(45) Date of Patent: Mar. 26, 2013

(54) WIRELESS COMMUNICATION APPARATUS AND POWER-SUPPLY APPARATUS

(75) Inventors: Hirotada Taniuchi, Kanagawa (JP); Shigeo Kusunoki, Kanagawa (JP); Tetsuo Kimura, Tokyo (JP); Akihito Kato, Tokyo (JP); Kazuhiko Saito, Tokyo (JP)

(73) Assignee: Sony Mobile Communications Japan, Inc., Tokyo (JP)

( * ) Notice: Subject to any disclaimer, the term of this patent is extended or adjusted under 35 U.S.C. 154(b) by 341 days.

(21) Appl. No.: 12/614,529

(22) Filed: Nov. 9, 2009

(65) Prior Publication Data

US 2010/0120475 A1 May 13, 2010

(30) Foreign Application Priority Data

Nov. 10, 2008 (JP) ................................ P2008-287463

(51) Int. Cl.
*H04M 1/00* (2006.01)
(52) U.S. Cl. ..................... 455/573; 455/572; 455/127.1; 455/343.1
(58) Field of Classification Search ............... 455/550.1, 455/572–574, 114.3, 127.1, 127.5, 343.1, 455/343.5–343.6; 320/107, 116–122, 134, 320/137, 140, 143, 166, 167; 323/220, 222, 323/234, 242, 266, 288, 316, 370
See application file for complete search history.

(56) References Cited

U.S. PATENT DOCUMENTS

| 3,997,832 A | 12/1976 | Tanaka et al. |
| 6,078,167 A * | 6/2000 | Oskowsky et al. ............ 323/222 |
| 6,188,274 B1 | 2/2001 | Vernon |
| 6,310,789 B1 | 10/2001 | Nebrigic et al. |
| 2002/0141205 A1* | 10/2002 | Kitano ............................ 363/16 |
| 2007/0185590 A1 | 8/2007 | Reindel et al. |
| 2009/0059630 A1* | 3/2009 | Williams ........................ 363/60 |

FOREIGN PATENT DOCUMENTS

| DE | 2531647 | 2/1976 |
| EP | 1 672 763 | 6/2006 |
| JP | 6 252820 | 9/1994 |

* cited by examiner

*Primary Examiner* — Marcos Torres
(74) *Attorney, Agent, or Firm* — Frommer Lawrence & Haug LLP; William S. Frommer; Ellen Marcie Emas

(57) ABSTRACT

A wireless communication apparatus includes a power-supply apparatus configured to supply electric power to a load that is intermittently operated by using a battery as a power supply; and a control unit configured to control the power-supply apparatus, wherein the power-supply apparatus includes a capacitor; a switching unit capable of selectively forming a first path through which charging is performed from the battery to the capacitor and a second path through which the battery is connected in series with the capacitor, and wherein the control unit controls the switching unit so that the first path is formed during a period in which the load is idle and the second path is formed during a period in which the load is not idle, and thereby supplies the voltage of the sum of the battery voltage and the charged voltage of the capacitor in a non-idle period.

14 Claims, 15 Drawing Sheets

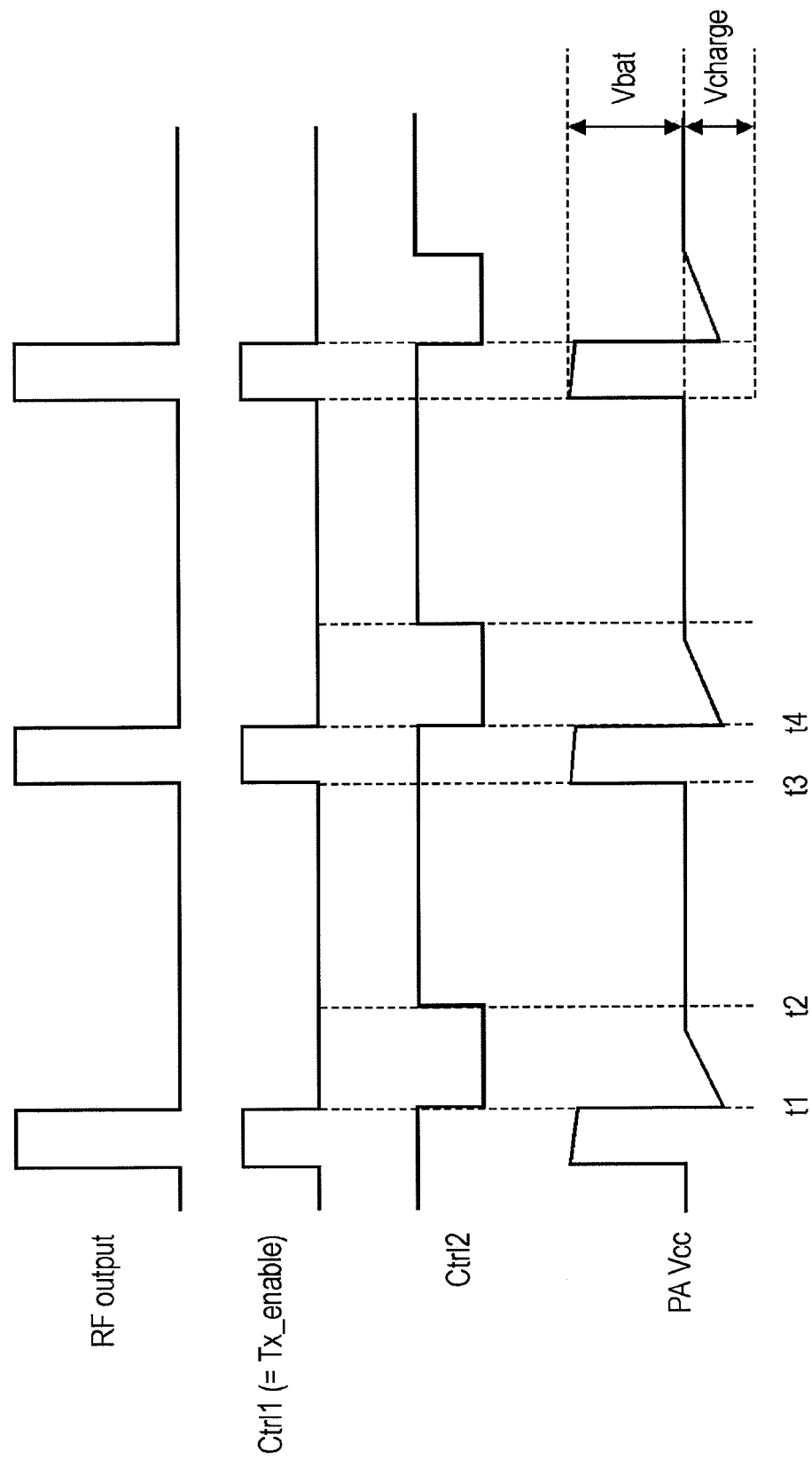

WIRELESS COMMUNICATION APPARATUS AND POWER-SUPPLY APPARATUS

BACKGROUND OF THE INVENTION

1. Field of the Invention

The present invention relates to a power-supply apparatus for supplying electric power to a load that is intermittently operated by using a battery as a power supply and to a wireless communication apparatus using the power-supply apparatus.

2. Description of the Related Art

In recent years, for wireless communication apparatuses, such as mobile phone terminals, longer service life of batteries has been a challenge for higher functionality and broader applications. As secondary batteries for mobile phone terminals, at present, lithium-ion (Li-ion) batteries have been widely used. Not limited to lithium-ion batteries, when batteries are discharged, the output voltage (that is, the battery voltage) is decreased. When the battery voltage reaches the vicinity of the lower limit of the operating voltage of each unit or IC, in order to prevent malfunction, the fact that the battery has no remaining capacity is displayed, and functioning of the terminal is stopped.

A bottleneck regarding a battery voltage being low and the battery being difficult to use in a mobile phone terminal is due to a power amplifier (PA), in particular, a PA for GSM/EDGE. The reason for this is that large electric power becomes necessary to send radio waves to a base station. Since electric power=voltage×electrical current, a decrease in the battery voltage makes it difficult to obtain the maximum output specified in the communication method.

Hitherto, a power-supply circuit capable of supplying electric power to an RF power amplifier at an efficiency of approximately the same degree as in a case where a battery of a high output voltage and a regulator are used, and a wireless communication apparatus employing a time-division multiplexing method, in which a lithium-ion battery of a low output voltage is used as a power supply, have been proposed (see Japanese Unexamined Patent Application Publication No. 6-252820). In this power-supply circuit, by using a step-up DC-DC converter, a power-supply voltage supplied from a battery is pulled up to a desired voltage for a power amplifier (PA), and is stored temporarily in a capacitor, so that when transmission is to be performed, the voltage stored in the capacitor is supplied to the power amplifier. The relationship between a battery voltage Vbat and a voltage Vcharge charged in the capacitor is constantly Vcharge>Vbat.

SUMMARY OF THE INVENTION

As in the technology of the related art, as a measure for countering a decrease in the battery voltage, a step-up DC-DC converter is used. It is necessary for a PA for GSM to have 3 A at the maximum electrical current, and a DC-DC converter that satisfies this condition is large-sized. Thus, it is difficult to carry the DC-DC converter in a portable device, or attraction of the apparatus as a product is deteriorated.

Accordingly, there has been a demand for compact power-supply means capable of supplying large electrical current to a PA.

It is desirable to provide a comparatively compact power-supply apparatus capable of supplying electric power with a comparatively large electrical current to a load that is intermittently operated by using a battery as a power supply, and a wireless communication apparatus using the power-supply apparatus.

According to an embodiment of the present invention, there is provided a wireless communication apparatus including: a power-supply apparatus configured to supply electric power to a load that is intermittently operated by using a battery as a power supply; and control means for controlling the power-supply apparatus, wherein the power-supply apparatus includes a capacitor; switching means capable of selectively forming a first path through which charging is performed from the battery to the capacitor and a second path through which the battery is connected in series with the capacitor, and wherein the control means controls the switching means so that the first path is formed during a period in which the load is idle and the second path is formed during a period in which the load is not idle, and thereby supplies the voltage of the sum of the battery voltage and the charged voltage of the capacitor in a non-idle period.

As described above, the switching means is controlled to switch between the first path and the second path in accordance with whether the load is in the idle or non-idle period, thereby charging the capacitor by using a battery in the idle period of the load, adding the charged voltage of the capacitor to the battery voltage during a non-idle period, and supplying the voltage to the load.

The wireless communication apparatus may further include a battery voltage monitoring unit configured to monitor a battery voltage, wherein the control means may constantly turn off the first switch, turn on the second switch, and turn on the third switch when the battery voltage is higher than or equal to a predetermined voltage so as to apply battery output to the power amplifier regardless of whether or not the load is in an idle period. As a result, by directly using the battery output while the battery voltage is comparatively high, it is possible to improve the efficiency of the power-supply apparatus.

The control means may further include a function of adjusting the charged voltage of the capacitor. As a result, it is possible to make the sum of the battery voltage and the charged voltage of the capacitor approximately constant.

In response to power control of the power amplifier, the control means may constantly turn off the first switch, turn on the second switch, and turn on the third switch in the range of an output power level at which operation is possible with only the battery voltage, thereby applying battery output to the power amplifier regardless of whether or not the load is in an idle period. As a result, by directly using the battery output while the power level that is necessary by the power amplifier is comparatively low, it is possible to improve the efficiency of the power-supply apparatus.

According to another embodiment of the present invention, there is provided a wireless communication apparatus including: a power-supply apparatus configured to supply electric power to a load that is intermittently operated by using a battery as a power supply; and control means for controlling the power-supply apparatus. The power-supply apparatus includes a capacitor; a step-down DC-DC converter configured to step down a battery voltage and charge the capacitor; and switching means capable of selectively forming a first path through which charging is performed from the battery to the capacitor via the step-down DC-DC converter, and a second path through which the battery is connected in series with the capacitor. The control means controls the switching means so that the first path is formed during a period in which the load is idle and the second path is formed during a period in which the load is not idle, and thereby supplies the voltage of the sum of the battery voltage and the charged voltage of the capacitor during a non-idle period. By using the step-down DC-DC converter, the realization of voltage conversion with high efficiency can be expected.

The present invention can be used as a power-supply apparatus for use in each of the above-mentioned wireless communication apparatuses.

According to embodiments of the present invention, the switching means is controlled, so that in the idle period of the load, the charged voltage of the capacitor charged during a non-idle period is added to the battery voltage in the non-idle period, and is supplied to the load. As a result, it is possible to supply electric power with a comparatively large electrical current to the load. Furthermore, since a step-up DC-DC converter is not necessary, the power-supply apparatus can be decreased in size.

BRIEF DESCRIPTION OF THE DRAWINGS

FIG. 4 illustrates a waveform chart showing waveforms of a signal and a voltage in the main portions for the purpose of illustrating the operation of the power-supply apparatus shown in FIG. 2;

DESCRIPTION OF THE PREFERRED EMBODIMENTS

Preferred embodiments of the present invention will be described in detail below with reference to the drawings.

Figure 1:
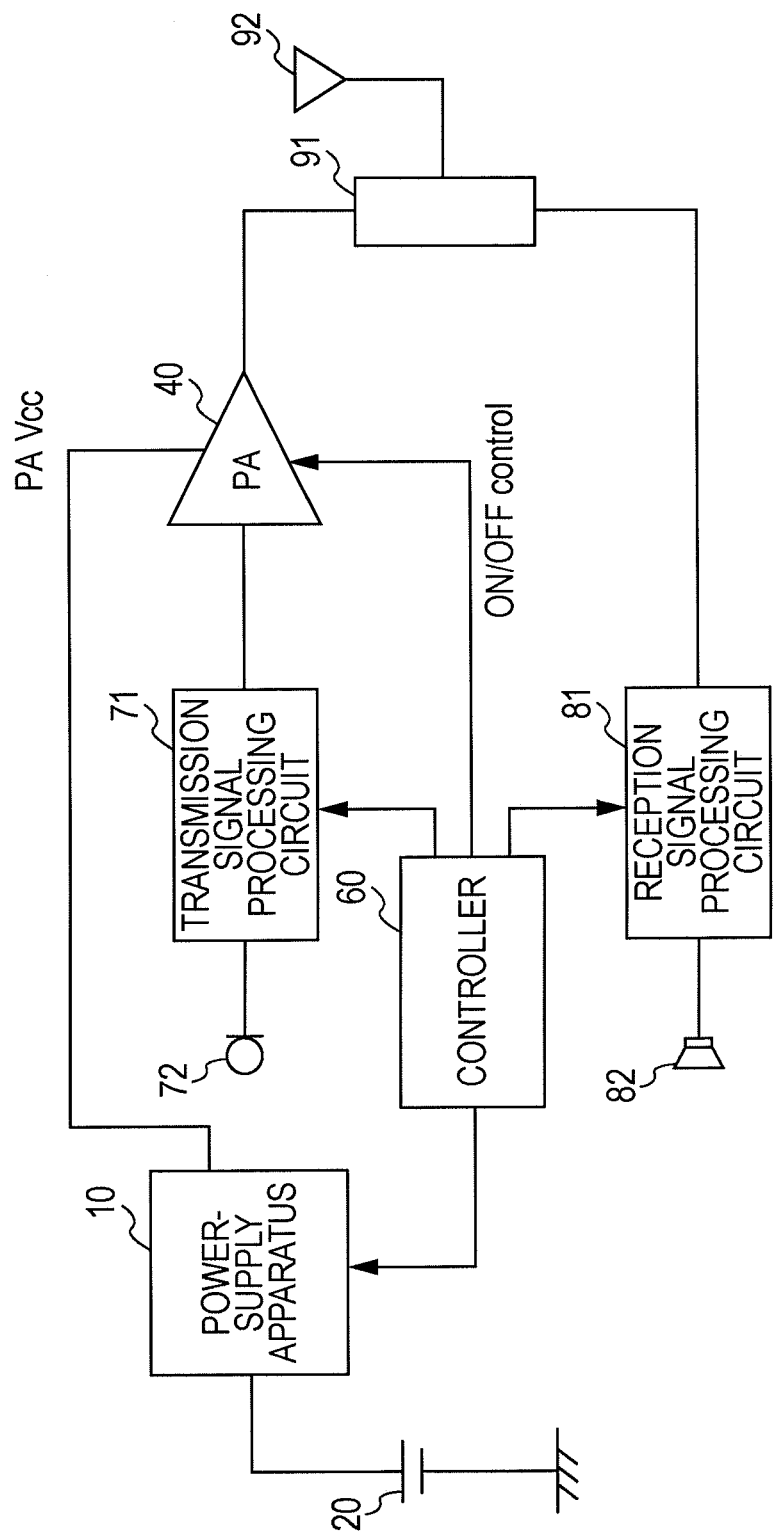
FIG. 1 illustrates a schematic configuration of a wireless communication apparatus employing a time-division multiplex communication method, in which a power-supply apparatus according to an embodiment of the present invention is used.

FIG. 1 illustrates a schematic configuration of a wireless communication apparatus employing a time-division multiplex communication method in which a power-supply apparatus according to an embodiment of the present invention is used. For the time-division multiplex communication method, a TDMA method for GSM is assumed. That is, during telephone conversation, transmission and reception of signals are performed using time slots in allocated transmission frames. For transmission and reception, different frequency bands are used.

A transmission signal processing circuit 71 converts an audio signal input from a microphone 72 from analog to digital form, band-compresses the obtained digital audio signal, modulates a carrier signal of a transmission frequency within a predetermined time slot, and inputs it as a transmission signal to a power amplifier (PA) 40. Upon receiving the operating voltage from a power-supply apparatus 10, the power amplifier 40 performs power amplification of the input signal under the control of a controller 60. The output of the power amplifier 40 is connected to an antenna 92 via an antenna duplexer 91 and is transmitted as radio waves of a predetermined frequency.

On the other hand, the signal received by the antenna 92 is input to a reception signal processing circuit 81 via the antenna duplexer 91. The reception signal processing circuit 81 amplifies and demodulates the reception signal, further decompresses it so as to be decoded as an audio signal, and outputs the signal as sound from a speaker 82.

The output voltage of a battery 20 is input to the power-supply apparatus 10, and is applied as a higher voltage PAVcc to the power amplifier 40 at a predetermined timing under the control of the controller 60. The battery is a secondary battery of Li-ion, Li polymer, or the like, and is such that the output voltage is at least ½ or more of the necessary power-supply voltage of the power amplifier 40.

The controller 60 is a unit that controls each unit of the wireless communication apparatus and is constituted by a CPU and the like.

Although not shown in the figures, the operation power for the controller 60, the transmission signal processing circuit 71, the reception signal processing circuit 81, and the like is supplied from the battery 20.

Figure 2:
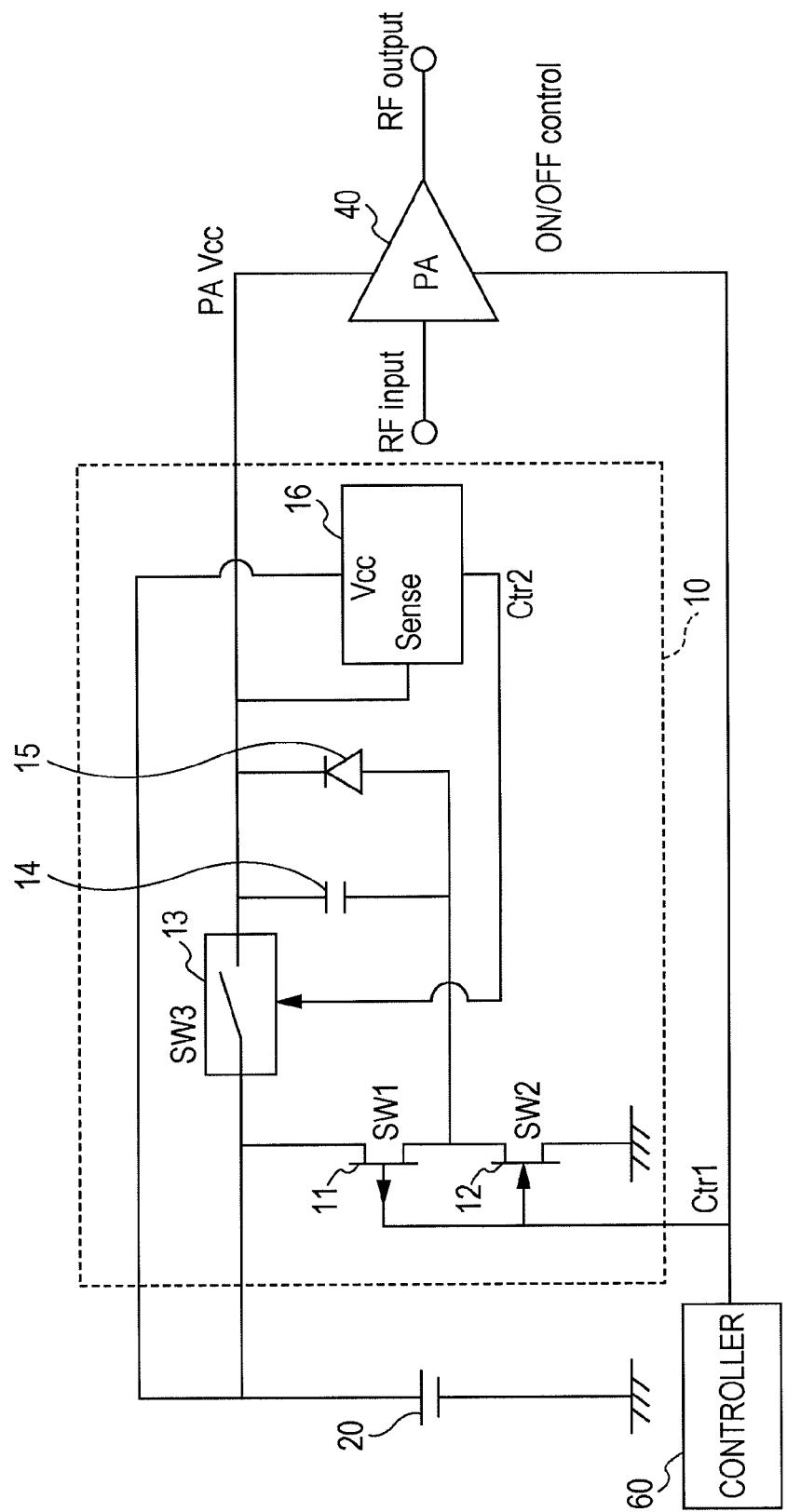
FIG. 2 illustrates a circuit diagram in which the internal circuit of the power-supply apparatus of FIG. 1 is shown together with a controller and a power amplifier.

FIG. 2 illustrates a circuit diagram showing the internal circuit of the power-supply apparatus 10 in FIG. 1 together with the controller 60 and the power amplifier 40. The power amplifier 40 constitutes a load (load that is pulse operated) that is intermittently operated in an embodiment of the present invention.

The power-supply apparatus 10 is constituted by a first switch 11 (SW1), a second switch 12 (SW2), a third switch 13 (SW3), a large-capacitance capacitor 14, a Zener diode 15, and a voltage monitoring unit 16. Examples of the large-capacitance capacitor 14 include an electric double-layer capacitor, a lithium-ion capacitor, and a ceramic capacitor.

The switch 13 (SW3) selectively connects the positive voltage terminal of the battery 20 to the power terminal of the power amplifier 40. The input end of SW3 is grounded via a series connected circuit of SW1 and SW2. The large-capacitance capacitor 14 is inserted between the output end of SW3 and the connection point of SW1 and SW2. Furthermore, the Zener diode 15 is connected in parallel to the large-capacitance capacitor 14 with the cathode thereof facing the SW3 side.

In the present embodiment, SW1 is constituted by a P-type MOSFET and SW2 is constituted by an N-type MOSFET. It is preferable that the permissible current of SW1 satisfy the maximum electrical current of 3 A. Furthermore, it is preferable that the on-resistance of SW1 and SW2 be a predetermined low resistance value (in this example, 0.2Ω or lower). The reason for this is that the on-resistance of SW1 and SW2 is an important parameter for determining the efficiency of the power-supply apparatus. For example, in a case where the burst electrical current is 2 A, the PA power-supply voltage (PAVcc) is 3.5 V, and the on-resistance of SW1 is 0.2Ω, an energy loss of 12% is estimated due to the on-resistance of SW1. A first control signal Ctr1 from the controller 60 is applied to the gate terminal of each of SW1 and SW2, so that a complementary operation such that when one of them is ON, the other becomes OFF is performed.

Examples of elements as candidates forming SW3 include an MEMS (Micro Electro Mechanical System) and a P-type MOSFET. A P-type MOSFET is appropriate in terms of cost. Similarly to SW1 and SW2, a low on-resistance is desirable. Furthermore, the permissible current of SW3 is preferably a maximum electrical current of 400 mA or more.

In the present embodiment, the "switching means" of the present invention can selectively form a first path through which charging is performed to the large-capacitance capacitor 14 from the battery 20, and a second path through which the battery 20 is connected in series with the large-capacitance capacitor 14. More specifically, the power-supply apparatus 10 is constituted by SW1 and SW2 that are connected between the output end of the battery 20 and a ground and are turned on/off in a complementary manner, and a SW3 that selectively connects the output end of the battery 40 to one end of the large-capacitance capacitor 14. The other end of the large-capacitance capacitor 14 is connected to the connection point of SW1 and SW2.

Since SW3 has only a simple ON/OFF function, the relationship between the battery voltage Vbat and the voltage Vcharge charged in the capacity is Vcharge Vbat. In the present embodiment, in the idle state in which the power amplifier 40 is not operating, a voltage higher than the voltage set by the voltage monitoring unit 16 is not charged in the large-capacitance capacitor 14. The voltage monitoring unit 16 detects the voltage charged in the large-capacitance capacitor 14 and outputs an ON/OFF control signal to SW3. More specifically, in a case where the charged voltage of the large-capacitance capacitor 14 is lower than or equal to a desired voltage, a control signal that turns on SW3 is output, and in a case where the charged voltage is higher than or equal to a desired voltage, a control signal that turns off SW3 is output. The maximum voltage applied to one of the terminals of SW3 is Vcc+Vcharge during the non-idle period. In the configuration of FIG. 2, in a case where a P-type MOSFET is used for SW3, the OFF signal voltage to be input to SW3 is Vcc. In order to prevent the reverse current from the large-capacitance capacitor to the battery in the non-idle period, it is necessary that the gate threshold value voltage Vth of SW3 is Vth<−Vcharge. In a case where the voltage of the OFF signal of the control signal of SW3 is made to be higher than or equal to Vcc+Vcharge via a buffer, the gate threshold value voltage is not limited.

It is preferable that the capacity of the large-capacitance capacitor 14 be a comparatively large value (in this example, 17 mF or larger). Similarly, it is preferable that the internal resistance value of SW1, SW2, and SW3 be 0.2Ω from the viewpoint of efficiency.

The Zener diode 15 is intended to protect the large-capacitance capacitor 14. Criterions for selecting the Zener diode 15 are that the ON voltage is higher than or equal to the upper limit of the operating voltage of the PA and lower than or equal to the maximum rating of the large-capacitance capacitor 14.

The voltage monitoring unit 16 is a capacitor voltage monitoring unit that monitors the output voltage of the large-capacitance capacitor 14, generates a second control signal Ctr2 on the basis of the monitoring result, and thereby controls SW3. The power-supply voltage of the voltage monitoring unit 16 is preferably supplied directly from the battery 20. The voltage monitoring unit 16 outputs, as the control signal Ctr2, an ON signal for SW3 when the charged voltage Vcharge of the large-capacitance capacitor 14 is lower than a predetermined target voltage Vt, and outputs an OFF signal for SW3 when the charged voltage is higher than or equal to the target voltage Vt. In a case where a P-type MOSFET is used for SW3, the control signal Ctr2 is set to be at a low level (0 V) when the charged voltage Vcharge is lower than the predetermined target voltage Vt, and is set to be at a high level (Vcc) when the charged voltage Vcharge is higher than or equal to Vcharge. The gate threshold value voltage of the voltage monitoring unit 16 that controls SW3 is determined in view of the balance to the voltage Vcharge to be charged in the large-capacitance capacitor 14. That is, by adjusting the gate threshold value voltage, it is possible to change the timing at which SW3 is turned off so as to adjust Vcharge.

The output of the transmission signal processing circuit 71 of FIG. 1 is input to the signal input terminal RFinput of the power amplifier 40. The power amplifier 40 is a PA for TDMA modulation, such as for GSM. Since a typical power amplifier 40 for GSM has a terminal for controlling ON/OFF of the power amplifier 40, by using a signal synchronized with the ON/OFF control signal of the power amplifier 40 or by branching and using the ON/OFF control signal as the control signal of SW2, the circuit can be simplified.

Figure 3A:
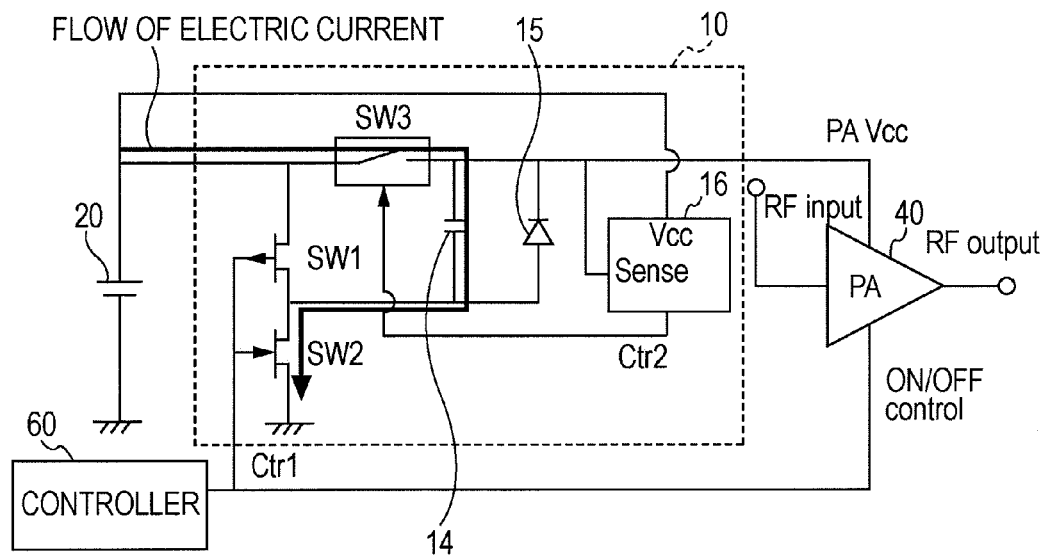
FIGS. 3A and 3B are operation diagrams of the power-supply apparatus shown in FIG. 2.

Next, the operation of the power-supply apparatus 10 shown in FIG. 2 will be described with reference to the operation diagrams of FIGS. 3A and 3B. FIG. 3A shows the operation when the power amplifier 40 is in an idle state, and FIG. 3B shows the operation when the power amplifier 40 is operating (that is, at RF transmission time).

(1) When the power amplifier 40 is in an idle state, the first control signal Ctr1 from the controller 60 causes the state of SW1=OFF and SW2=ON. It is assumed at this time that the voltage Vcharge of the large-capacitance capacitor 14 has not yet reached the specified target voltage Vt. Therefore, the control signal Ctr2 from the voltage monitoring unit 16 causes the state of SW3=ON. As a result, as indicated using the thick arrow in FIG. 3A, electric charge is charged from the battery 20 to the large-capacitance capacitor 14 along the first path that connects the battery 20 through SW3 and the large-capacitance capacitor 14 to SW2.

(2) When the voltage Vcharge of the large-capacitance capacitor 14 reaches the specified target voltage Vt, the output signal Ctr2 of the voltage monitoring unit 16 is switched, and SW3=OFF.

Figure 3B:
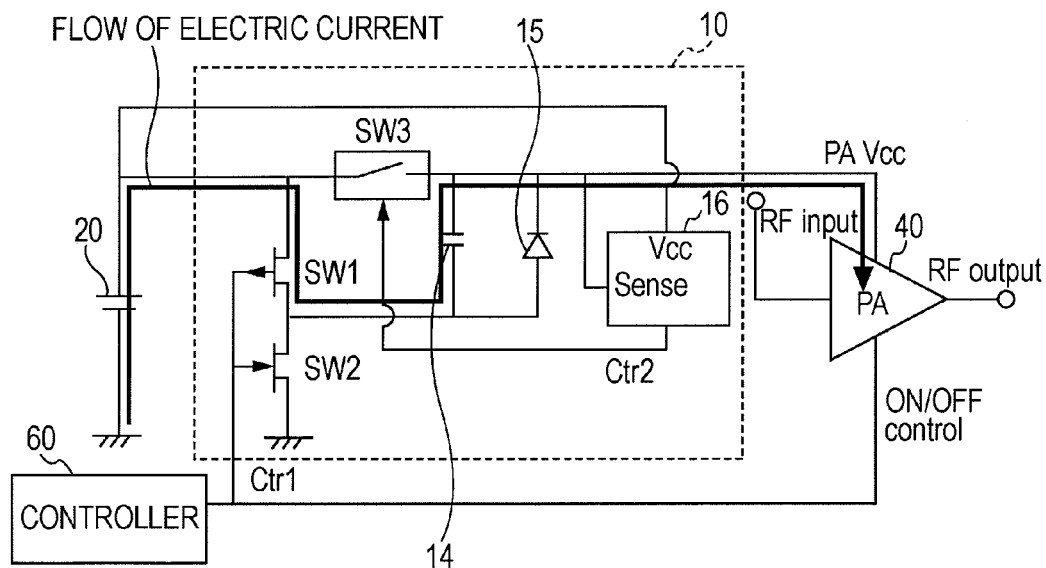

(3) As shown in FIG. 3B, at RF transmission time, an ON/OFF control signal that selectively enables the power amplifier 40 is output by the controller 60. Furthermore, in the example of the figure, the controller 60 controls SW1 and SW2 by using the first control signal Ctr1 generated by branching the ON/OFF control signal. At this time, SW1=ON, SW2=OFF, and SW3=OFF. As a result, as indicated using the thick arrow in FIG. 3B, the second path for electrical current, through which the battery 20 is connected in series with the large-capacitance capacitor 14, is formed. As a result, the power-supply voltage PAVcc of the power amplifier 40 becomes the sum of the battery voltage Vbat and the voltage Vcharge charged in the electric double-layer, that is, PAVcc=Vbat+Vcharge. With this configuration, even if the battery voltage Vbat is lower than a voltage necessary for the power amplifier 40, it is possible to cause the power amplifier 40 to be operated.

(4) When the transmission state ends, the ON/OFF control signal is switched. As a result, SW1 and SW2 are switched, and these return to the OFF and ON states, respectively. Furthermore, since the voltage of the large-capacitance capacitor 14 is decreased due to electrical discharge, the output signal Ctr2 of the voltage monitoring unit 16 is switched, and SW3 returns to ON. That is, the power-supply apparatus 10 returns to the state of FIG. 3A.

With such a configuration of the present embodiment, on the basis of the battery voltage Vbat=2.5 V, it is possible to supply PAVcc=3.85 V to the power amplifier 40. Furthermore, with the optimization of the circuit of the power-supply apparatus 10, efficiency of 90% is expected.

FIG. 4 is a waveform chart showing waveforms of a signal and a voltage of main portions for the purpose of illustrating the operation of the power-supply apparatus 10 shown in FIG. 2. In the figure, each waveform of the output RFoutput of the power amplifier 40, the control signal Ctr1 (ON/OFF control signal) from the controller 60, the control signal Ctr2 from the voltage monitoring unit 16, and the voltage PAVcc applied to the power amplifier 40 is shown. The period in which the control signal Ctr1 is at a low level is an idle period in which the power amplifier 40 enters an idle state. The period in which the control signal Ctr1 is at a high level is a non-idle period.

At time point t1 at which the RF output (RFoutput) is stopped, the electric charge of the large-capacitance capacitor 14 is discharged, and PAVcc sharply decreases. The voltage monitoring unit 16 that has detected this decrease sets the control signal Ctr2 to a low level. This causes SW3 to conduct, and the charging to the large-capacitance capacitor 14 is started. When the charged voltage Vcharge reaches a predetermined voltage at time point t2, the control signal Ctr2 reaches a high level, SW3 is disconnected, and the charging to the large-capacitance capacitor 14 is stopped. When the control signal Ctr1 reaches a high level at time point t3, SW1 is turned on, and SW2 is turned off, with the result that PAVcc jumps to a high voltage, which is the sum of the Vcharge and Vbat, through a conduction path shown in FIG. 3B. This causes RF output to be generated. Hereinafter, the above-described steps are repeated.

Figure 5:
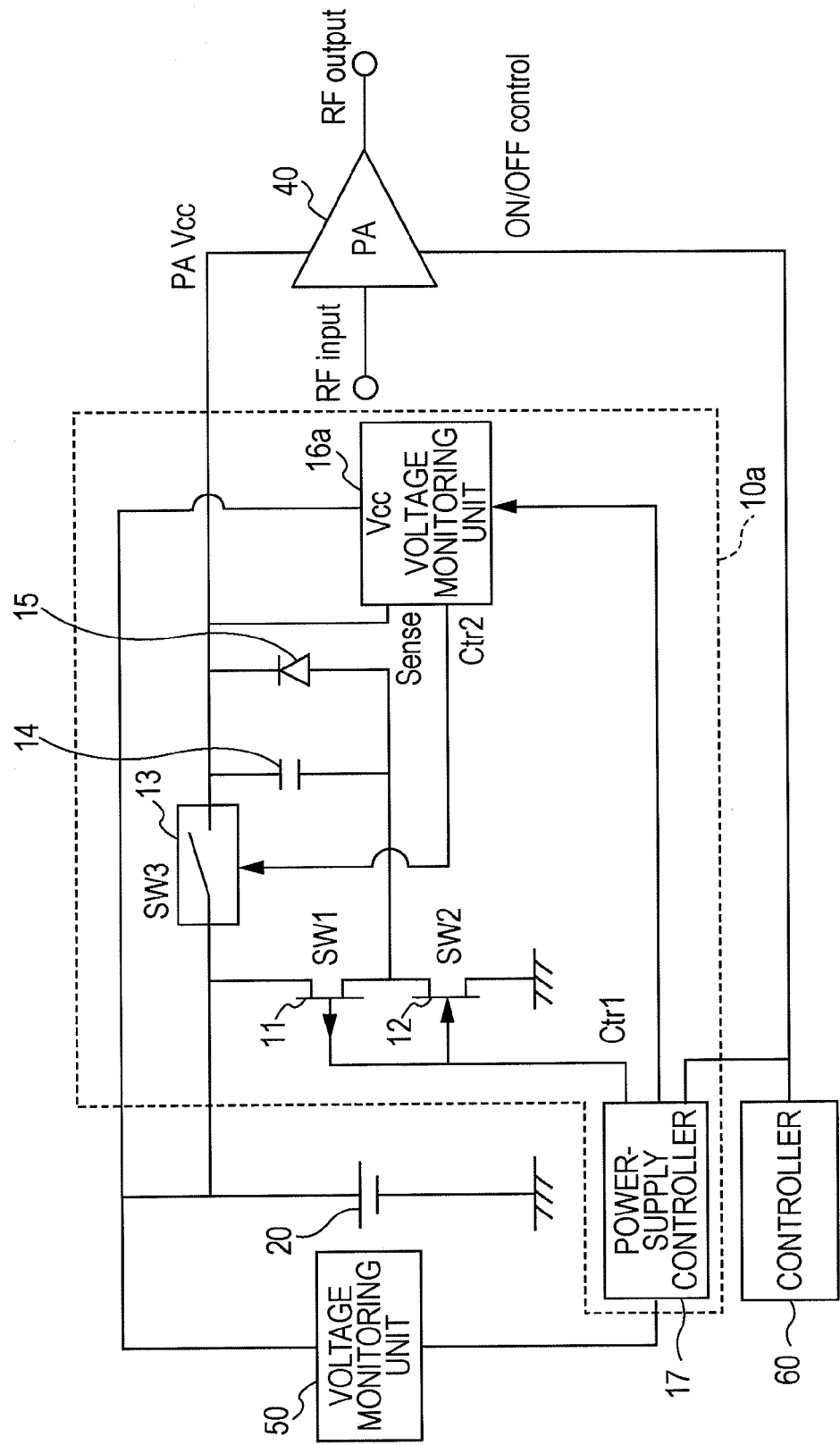
FIG. 5 shows a power-supply apparatus according to a second embodiment of the present invention, and a peripheral circuit thereof.

Next, FIG. 5 shows a power-supply apparatus 10a according to a second embodiment of the present invention, and a peripheral circuit thereof. Components, which are the same as the components of the circuit shown in FIG. 2, are designated with the same reference numerals, and accordingly, duplicated descriptions thereof are omitted.

In the configuration of FIG. 2, a description has been given in which the battery voltage is decreased as the electrical discharge from the battery 20 progresses. In the case of the range of the operating voltage of the power amplifier 40 of the battery discharge curve of FIG. 6, when the battery output is directly applied to the power amplifier 40, the electric power conversion efficiency is higher. Therefore, the monitoring result in the voltage monitoring unit 50 (battery voltage monitoring unit) is notified to the power-supply controller 17. The voltage monitoring unit 50 may be shared with a battery remaining amount monitor in general use. In a case where the battery voltage is higher than or equal to a predetermined voltage, the power-supply controller 17 and the voltage monitoring unit 16 are controlled to constantly set SW1=OFF, SW2=ON, and SW3=ON, so that the battery output is applied to the power amplifier 40 regardless of whether or not the power amplifier 40 is in an idle period. When the battery voltage falls below the predetermined voltage, operations identical to those of the configuration of FIG. 2 are performed.

Figure 6:
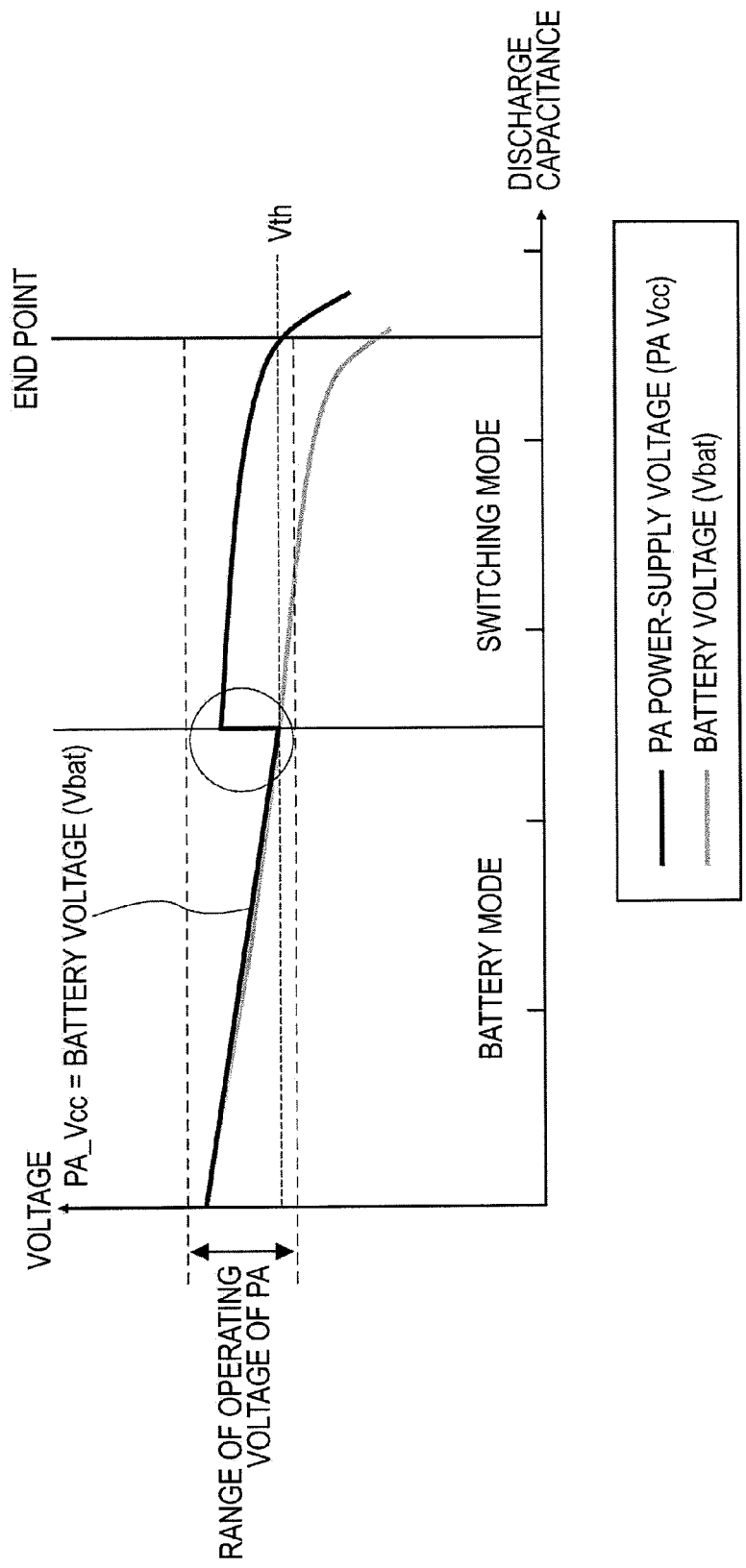
FIG. 6 is an illustration of the operation of the configuration of FIG. 4.

FIG. 6 is an illustration of operations of the configuration of FIG. 4. The operation in a case where the battery voltage (Vbat) is higher than or equal to the predetermined voltage will be referred to as a battery mode, and the battery voltage (Vbat) is directly used as PAVcc. The operation in a case where the battery voltage (Vbat) becomes lower than the predetermined voltage will be referred to as a switching mode. At this time, the battery voltage (Vbat) is stepped up by the above-described action to become PAVcc. The switching of the two modes is performed by the power-supply controller 17 on the basis of the output of the voltage monitoring unit 50. The ON/OFF control signal output from the controller 60 is temporarily input to the power-supply controller 17, and Ctr1 is input to SW1 and SW2. During the battery mode, the control signal Ctr1, which is constantly at a high level, is output regardless of whether the ON/OFF control signal is high or low.

Figure 7:
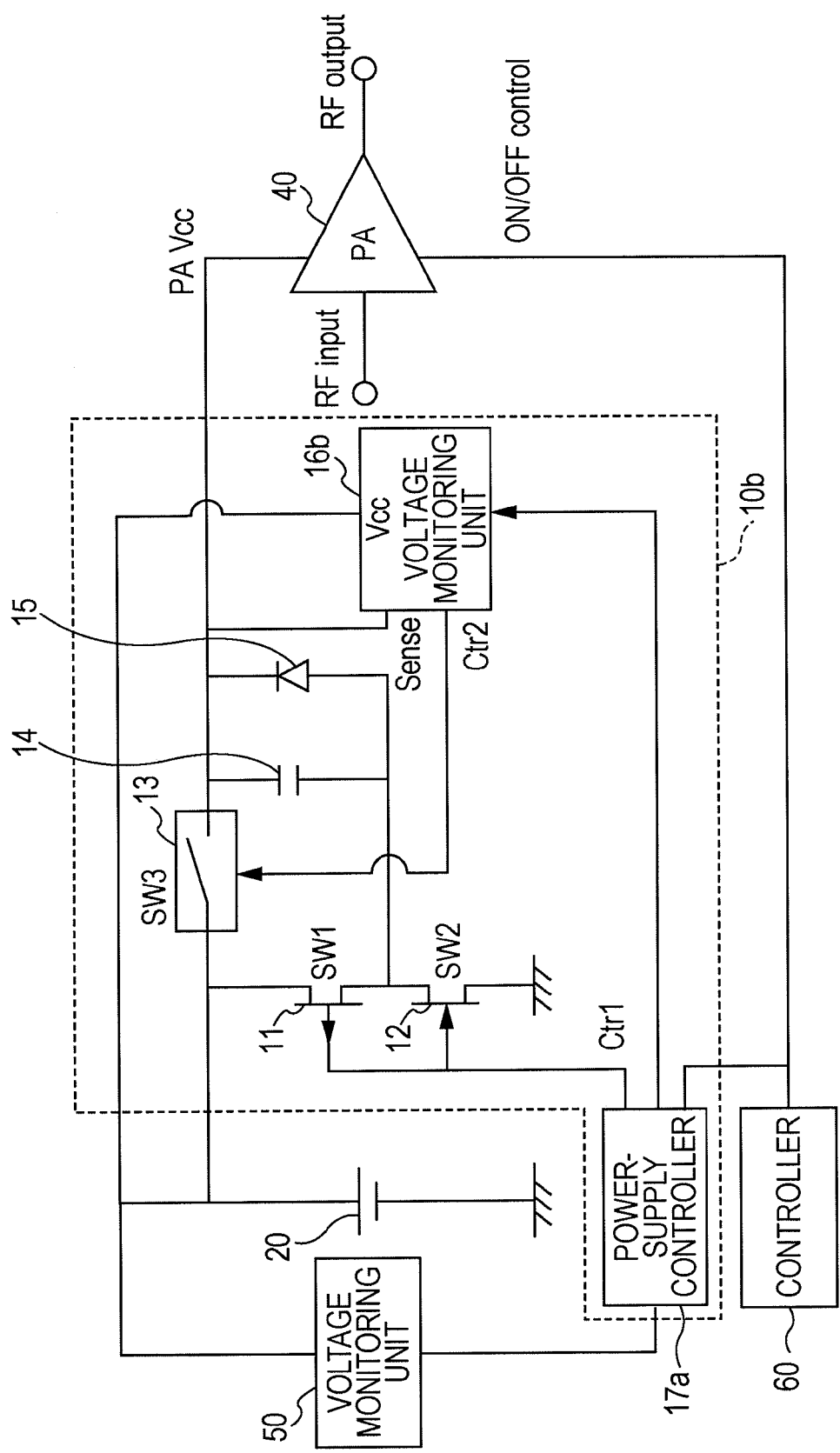
FIG. 7 shows a power-supply apparatus according to a third embodiment of the present invention, and a peripheral circuit thereof.

FIG. 7 shows a power-supply apparatus 10b according to a third embodiment of the present invention, and a peripheral circuit thereof. Components, which are the same as the components of the circuit shown in FIGS. 2 and 4, are designated with the same reference numerals, and accordingly, duplicated descriptions thereof are omitted.

In the present embodiment, on the basis of the output of the voltage monitoring unit 50, a power-supply controller 17a controls a target voltage to be detected by a voltage monitoring unit 16b, and controls a voltage Vcharge to be charged to the large-capacitance capacitor 14. As a result, a change in Vbat is compensated for using Vcharge, so that PAVcc=Vbat+Vcharge of the burst part in the switching mode is made approximately constant.

Merits due to this are as follows.

(1) In the switching mode, by setting PAVcc to an appropriate power-supply voltage of the power amplifier 40, it is possible to allow the power amplifier 40 to be operated at the good operation stability and transmission power efficiency of the power amplifier 40.

(2) Use is possible even where the discharge capacitance is larger and the battery voltage is decreased compared to the case in which Vcharge is fixed.

Figure 8:
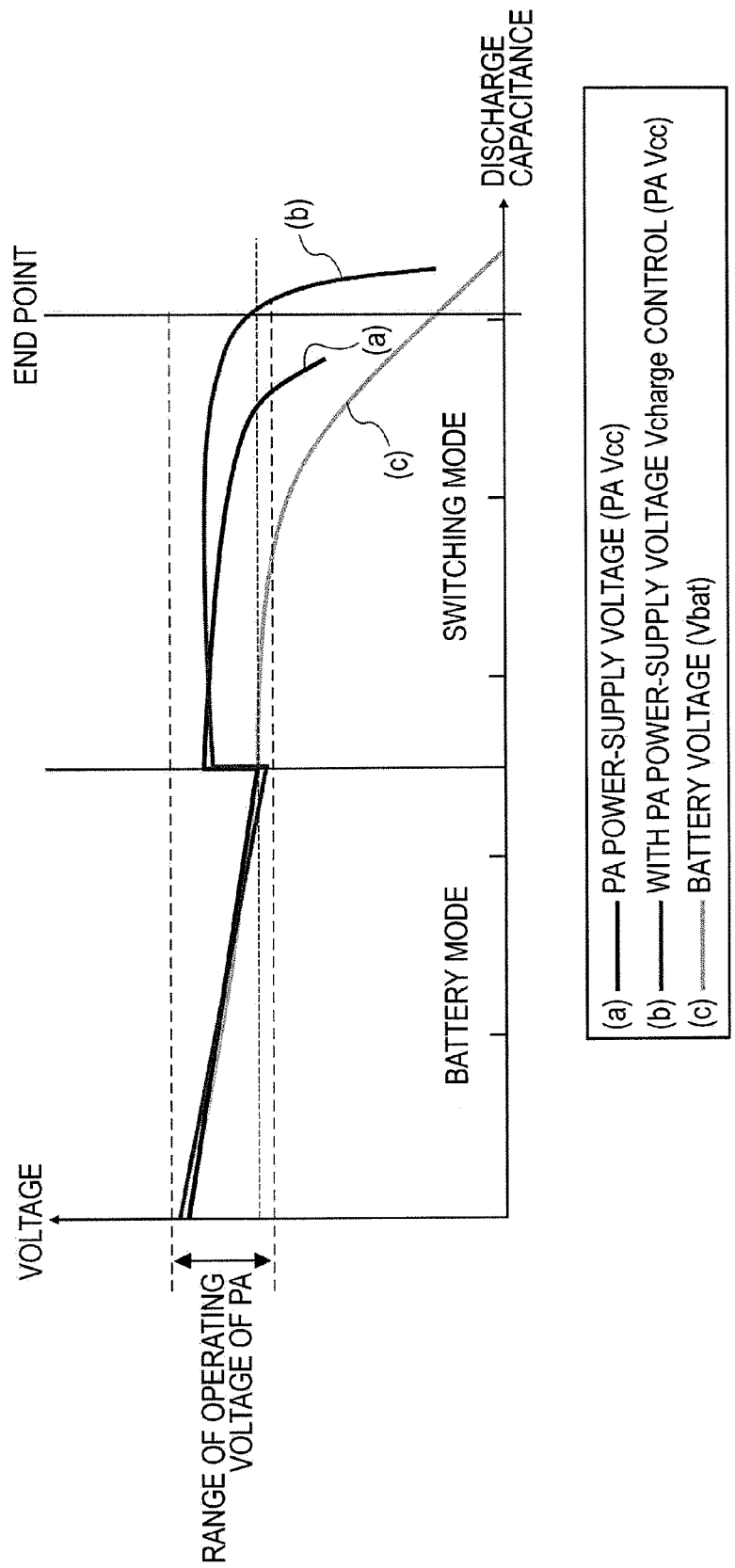
FIG. 8 illustrates a graph showing the operation regarding the third embodiment of the present invention.

FIG. 8 illustrates a graph showing operations according to the third embodiment of the present invention. Graph (c) shows a battery voltage (Vbat), and graph (a) shows a PA power-supply voltage (PAVcc) in the above-described embodiment. In comparison, graph (b) shows a PA power-supply voltage (PAVcc) in a case where control of Vcharge in the present embodiment is in effect. As can be seen from graph (b), in the switching mode of the present embodiment, since Vcharge is made variable to compensate for a decrease in Vbat, PAVcc=Vbat+Vcharge becomes flat. Therefore, the service life of the battery 20 can be substantially lengthened.

Figure 9:
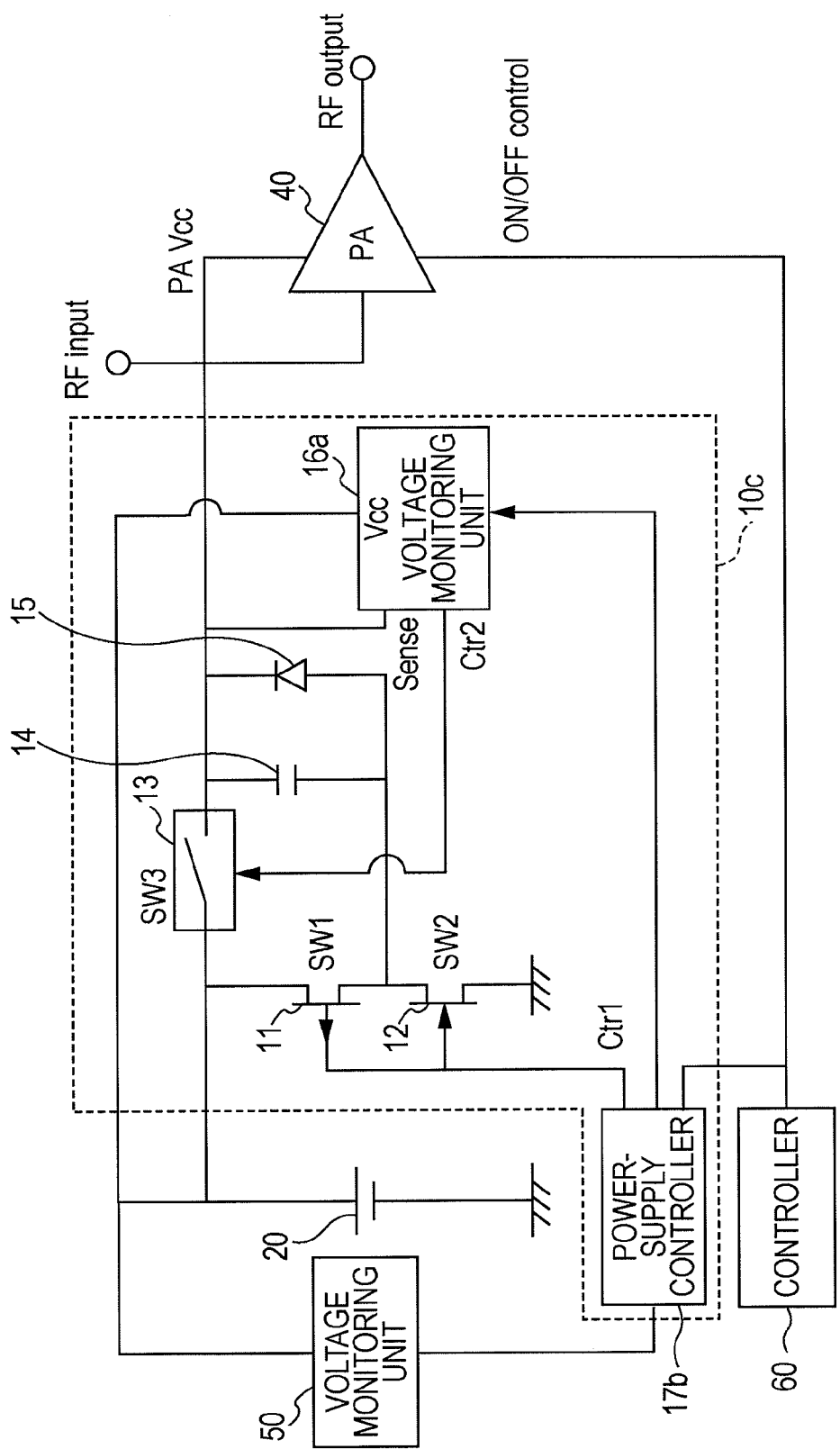
FIG. 9 shows a power-supply apparatus according to a fourth embodiment of the present invention, and a peripheral circuit thereof.

FIG. 9 shows a power-supply apparatus 10c according to a fourth embodiment of the present invention and a peripheral circuit thereof. Components, which are the same as the components of the previously shown circuit, are designated with the same reference numerals, and accordingly, duplicated descriptions thereof are omitted.

It is usual for the power amplifier 40 to be subjected to power control in accordance with the communication state from the base station. During the maximum power time, even if the operating voltage of PAVcc=Vbat+Vcharge is necessary, there is a case in which, during medium and low power time, only the battery voltage Vbat is sufficient. During such medium and low power time, by setting the power amplifier 40 to a battery mode, it is possible to increase the transmission power efficiency. The circuit configuration and the operation of the fourth embodiment are substantially the same as those of the second embodiment. A point of difference from the second embodiment is that a signal appropriate for the target output level as the power level of the power amplifier 40 is input from a controller 60a to the power-supply controller 17b, and the battery mode and the switching mode are switched in response to this signal.

Figure 10:
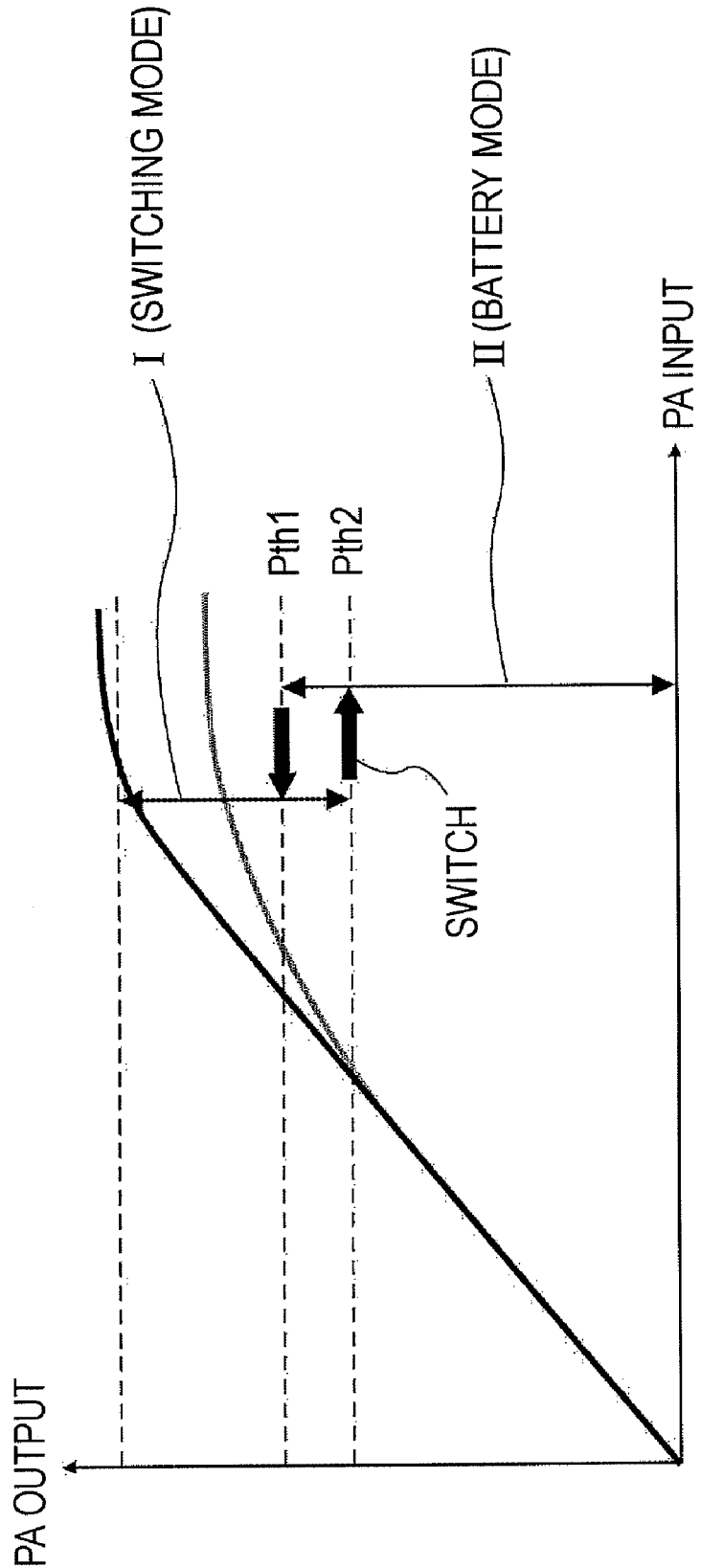
FIG. 10 illustrates a graph illustrating the operation regarding the fourth embodiment of the present invention.

That is, as shown in the graph of PA input versus PA output of FIG. 10, in the range I of the power level at which the power-supply voltage of Vbat+Vcharge is necessary, the switching mode is set, and in the range II of the output power level at which operation is possible with only Vbat, the battery mode is set. The switching of the modes based on the power level is performed with a hysteresis with two threshold values Pth1 and Pth2 so that an unstable switching does not occur.

Figure 11:
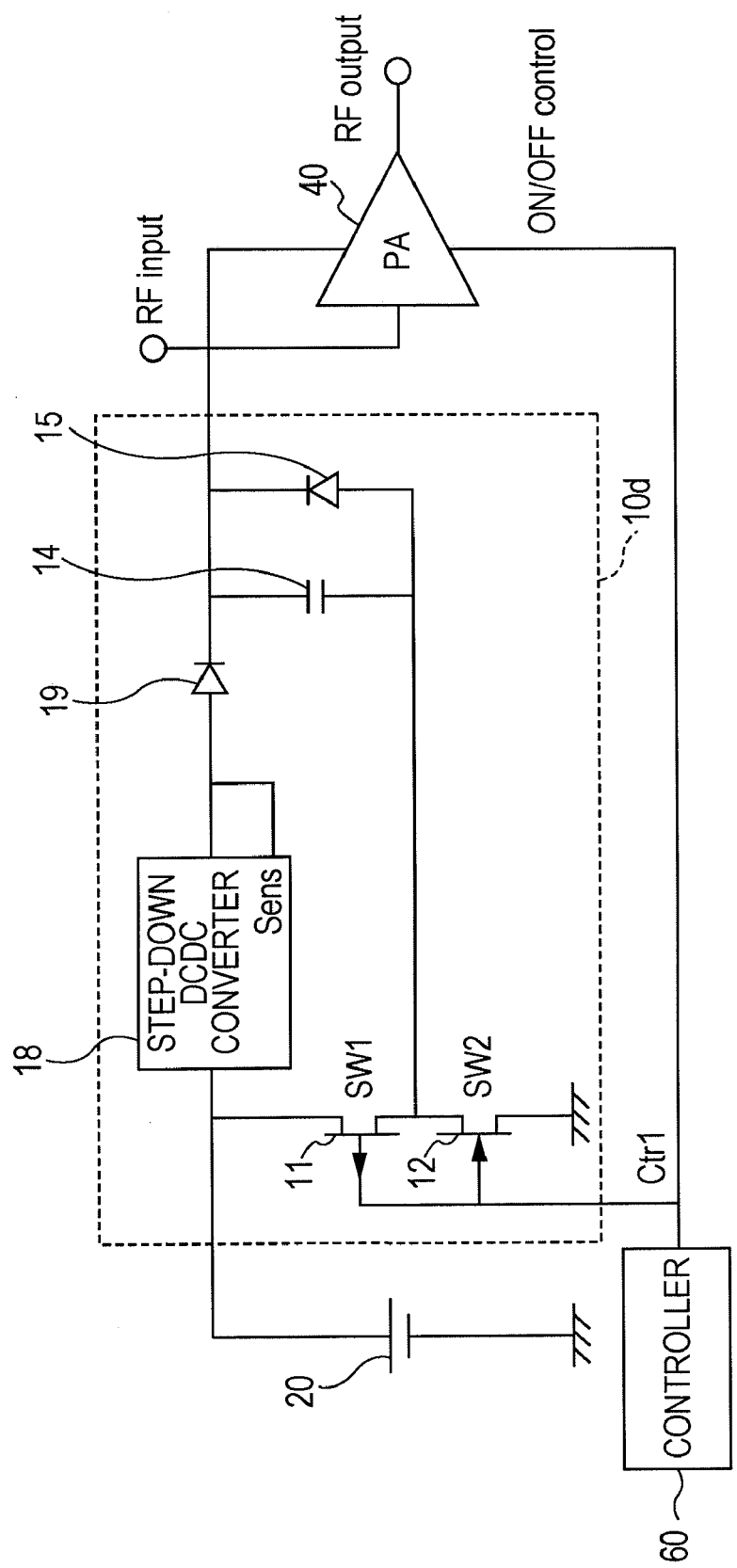
FIG. 11 illustrates a graph showing a power-supply apparatus according to the fourth embodiment of the present invention, and a peripheral circuit thereof.

FIG. 11 shows a power-supply apparatus 10d according to a fifth embodiment of the present invention, and a peripheral circuit thereof. Components, which are the same as the components of the previously shown circuit, are designated with the same reference numerals, and accordingly, duplicated descriptions thereof are omitted.

Figure 12A:
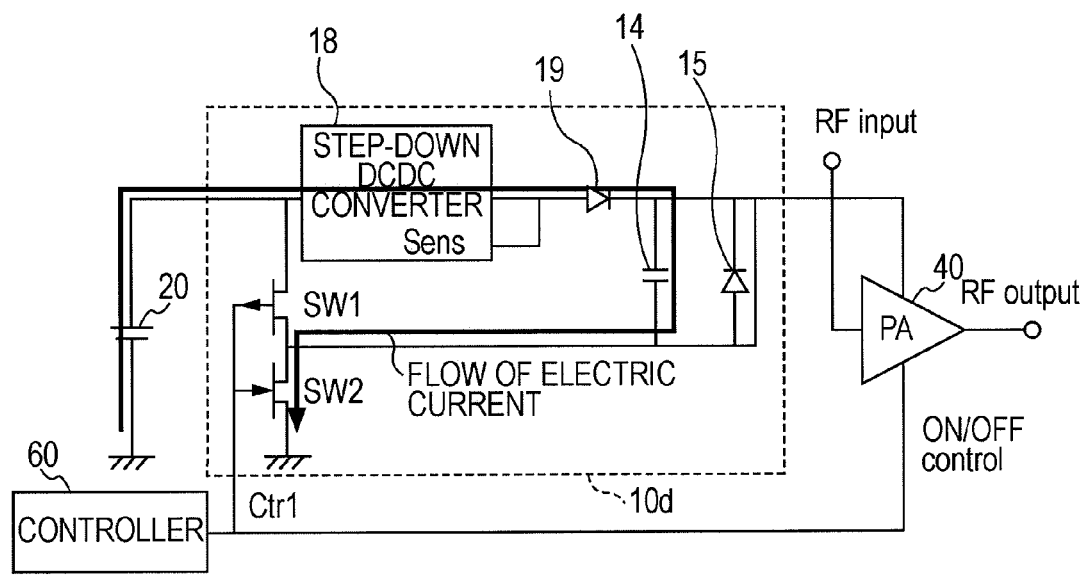
FIGS. 12A and 12B are illustrations of the operation of a circuit configuration according to a fifth embodiment of the present invention.
Figure 12B:
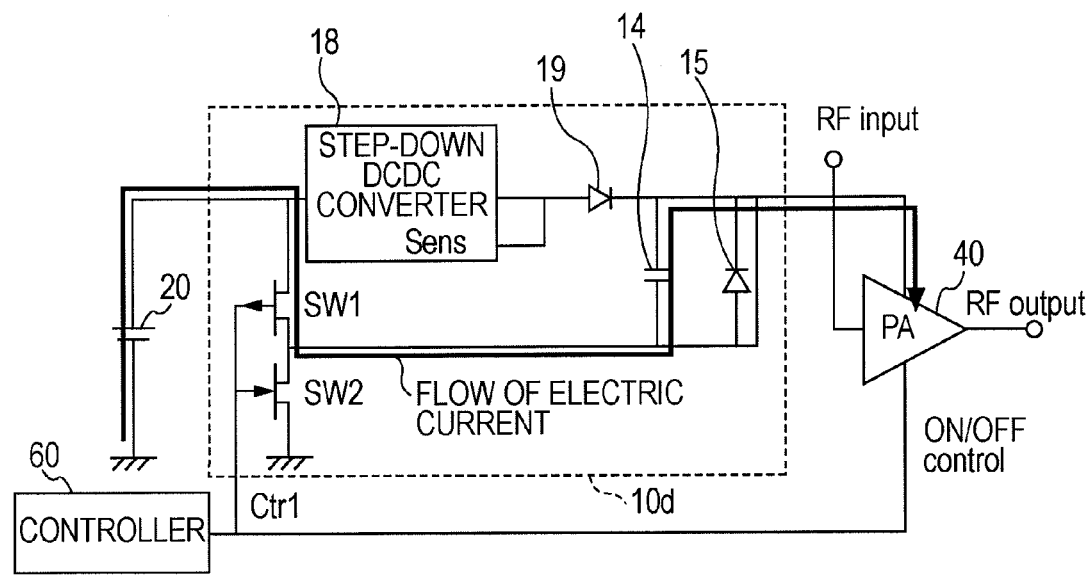

In the above-described embodiments, charging is performed to the large-capacitance capacitor 14 from the battery 20 with only switch control. However, in this case, the difference between the battery voltage and the charged voltage becomes electrical current, this is consumed in the switch and the internal resistance of the capacitor, and a loss is produced. Therefore, in the present embodiment, a voltage VDC-DC close to Vcharge is generated at a high efficiency via the DC-DC converter 18 and the diode 19, and is charged to the large-capacitance capacitor 14. As a result, it is possible to realize highly efficient voltage conversion. The diode 19 functions as a diode switch for preventing reverse current of electrical current during burst time. Since the on-resistance of the diode 19 affects electric power conversion efficiency, a diode having a low on-resistance (for example, a Schottky diode) is desirable. It is necessary for the DC-DC converter 18 to be of a step-down type and to be operable in the range of the upper and lower voltages of the battery 20. Furthermore, the maximum output current thereof is set at 400 mA or more in the present embodiment. The operation of the circuit configuration is as shown in FIGS. 12A and 12B. That is, (1) In the state shown in FIG. 12A, in which the power amplifier 40 is in an idle state, the state of SW1=OFF and SW2=0 is reached, and electric charge is charged to the large-capacitance capacitor 14. At this time, since the voltage applied to the diode 19 is in the forward direction, the diode 19 is turned on. Furthermore, at this time, the voltage charged to the large-capacitance capacitor 14 is determined by Vcharge=VDC-DC−Von on the basis of the output voltage VDC-DC of the DC-DC converter 18 and the ON voltage Von of the diode. Conversely, the appropriate output voltage VDC-DC of the DC-DC converter 18 is determined in accordance with the above expression.

(2) At RF transmission time, which is shown in FIG. 12B, an ON/OFF control signal that enables the power amplifier 40 is output from the controller 60, and SW1 and SW2 are switched in response to the control signal Ctr1. At this time, SW1=ON and SW2=OFF are reached. The power-supply voltage PAVcc of the power amplifier 40 becomes PAVcc=Vbat+Vcharge, which is the sum of the battery voltage Vbat and the voltage Vcharge charged to the electric double-layer. As a result, even if the battery voltage Vbat is lower than the voltage necessary by the power amplifier 40, it is possible to allow the power amplifier 40 to be operated. At this time, since a reverse direction voltage is applied to the diode 19, the diode 19 is turned off, thereby preventing the reverse current of the electrical current to the DC-DC converter 18.

(3) When the transmission state ends, the ON/OFF control signal of the power amplifier 40 is switched, causing SW1 and SW2 to be switched. Furthermore, since the voltage of the large-capacitance capacitor 14 is decreased due to electrical discharge, the output voltage of the DC-DC converter 18 becomes higher than the charged voltage Vcharge, and the diode 19 is turned on. In the manner described above, the state returns to the state of (1) above.

Figure 13:
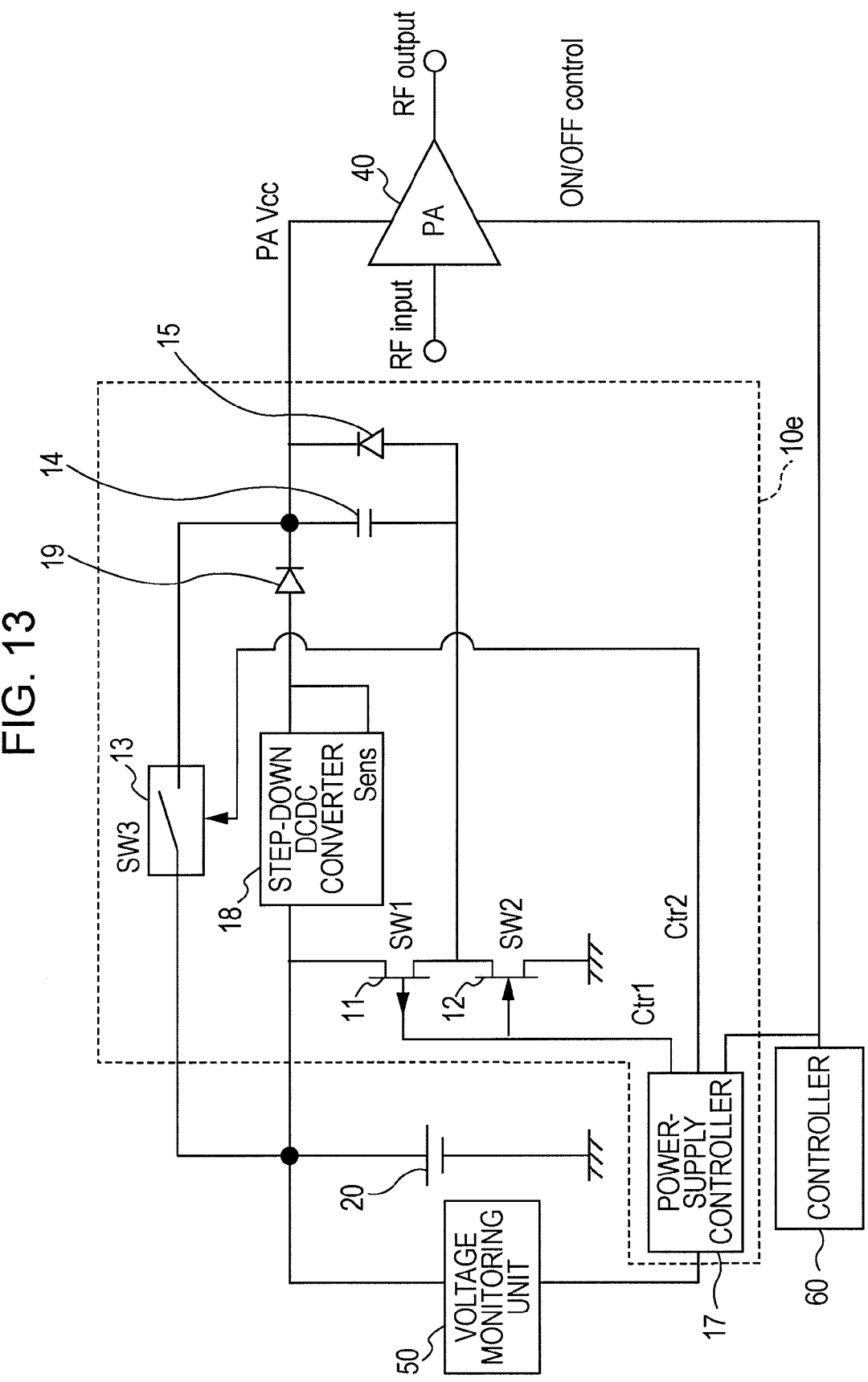
FIG. 13 shows a power-supply apparatus according to a sixth embodiment of the present invention, and a peripheral circuit thereof.

FIG. 13 shows a power-supply apparatus 10e according to a sixth embodiment of the present invention, and a peripheral circuit thereof. Components, which are the same as the components of the previously shown circuit, are designated with the same reference numerals, and accordingly, duplicated descriptions thereof are omitted.

This embodiment is such that the second embodiment shown in FIG. 5 and the fifth embodiment shown in FIG. 11 are combined. That is, the concept of the battery mode and the switching mode of the second embodiment shown in FIG. 5 is introduced to the form in which the step-down DC-DC converter 18 of FIG. 11 is used. In the present embodiment, the voltage monitoring unit 16 (16a) does not exist, and SW3 is controlled in accordance with the control signal Ctr2 from the power-supply controller 17. The power-supply controller 17 causes SW3 to be turned on while the battery voltage Vbat is high, and directly uses the battery voltage Vbat as PAVcc. When the voltage is decreased to below the battery voltage Vbat, SW3 is turned off, and Vbat+Vcharge is used as PAVcc.

Figure 14:
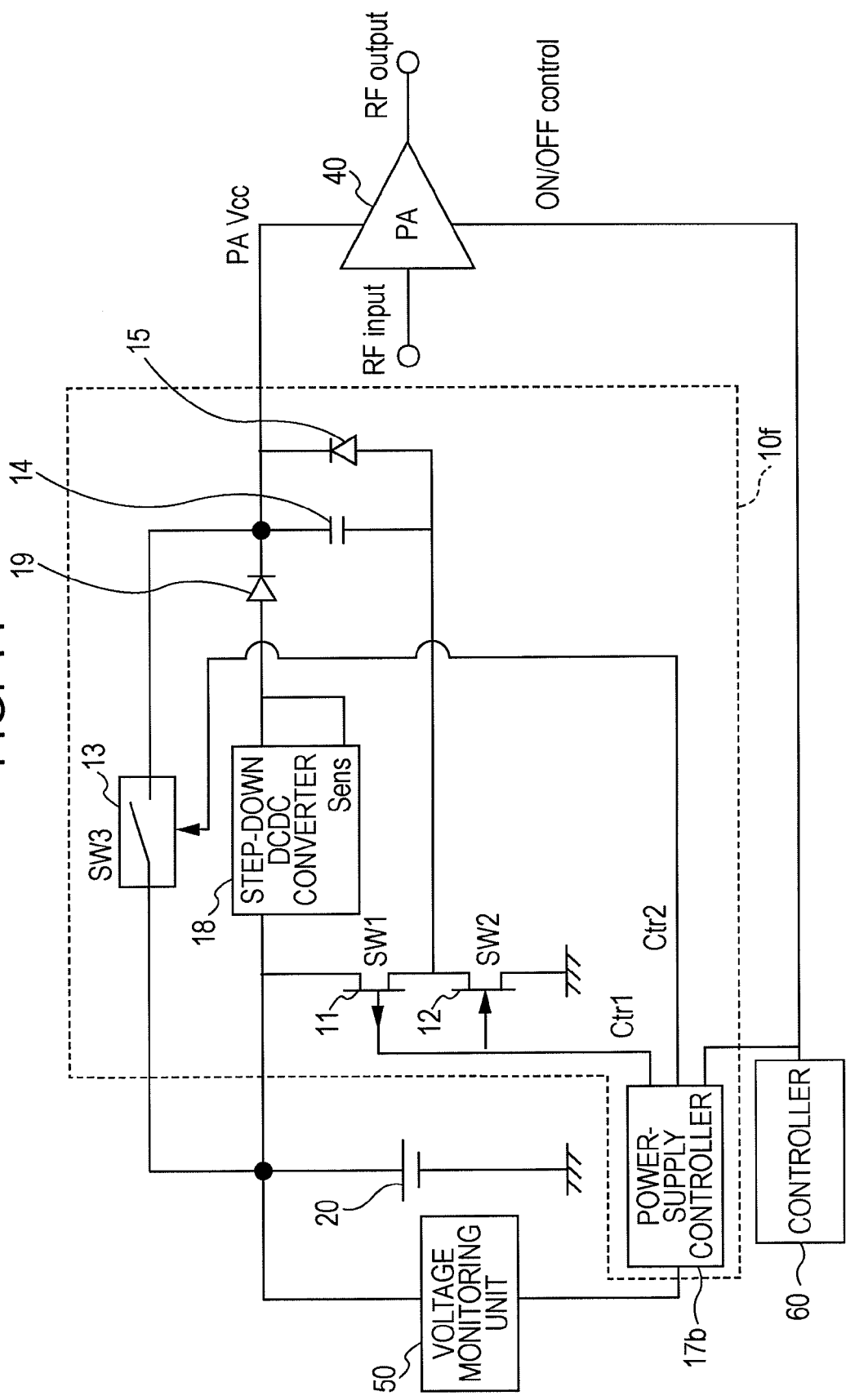
FIG. 14 shows a power-supply apparatus according to a seventh embodiment of the present invention, and a peripheral circuit thereof.

FIG. 14 shows a power-supply apparatus 10f according to a seventh embodiment of the present invention, and a peripheral circuit thereof. Components, which are the same as the components of the previously shown circuit, are designated with the same reference numerals, and accordingly, duplicated descriptions thereof are omitted.

The present embodiment shows a modification of the sixth embodiment shown in FIG. 13. In other words, the concept of control appropriate for the power level of the fourth embodiment shown in FIG. 9 is introduced to the sixth embodiment of FIG. 13.

Similarly to the fourth embodiment, the power amplifier 40 is subjected to power control according to the communication state from the base station. During the maximum power time, even if the operating voltage of PAVcc=Vbat+Vcharge is necessary, there is a case in which the battery voltage Vbat is sufficient during the medium power time. Furthermore, in a case where only the voltage VDC-DC lower than Vbat is sufficient, this will be referred to as a third operation mode (referred to as a DC-DC mode) in which the output of the DC-DC converter 18 is directly applied to the power amplifier 40. Such switching of the operation modes enables the efficiency to be increased. The circuit configuration and the operation thereof are substantially the same as those of the sixth embodiment. The point of difference is that a signal appropriate for the target output level of the power amplifier 40 is input from the controller 60a to the power-supply controller 17b, and in response to this signal, the power-supply controller 17b switches the battery mode, the switching mode, and the DC-DC mode.

Figure 15:
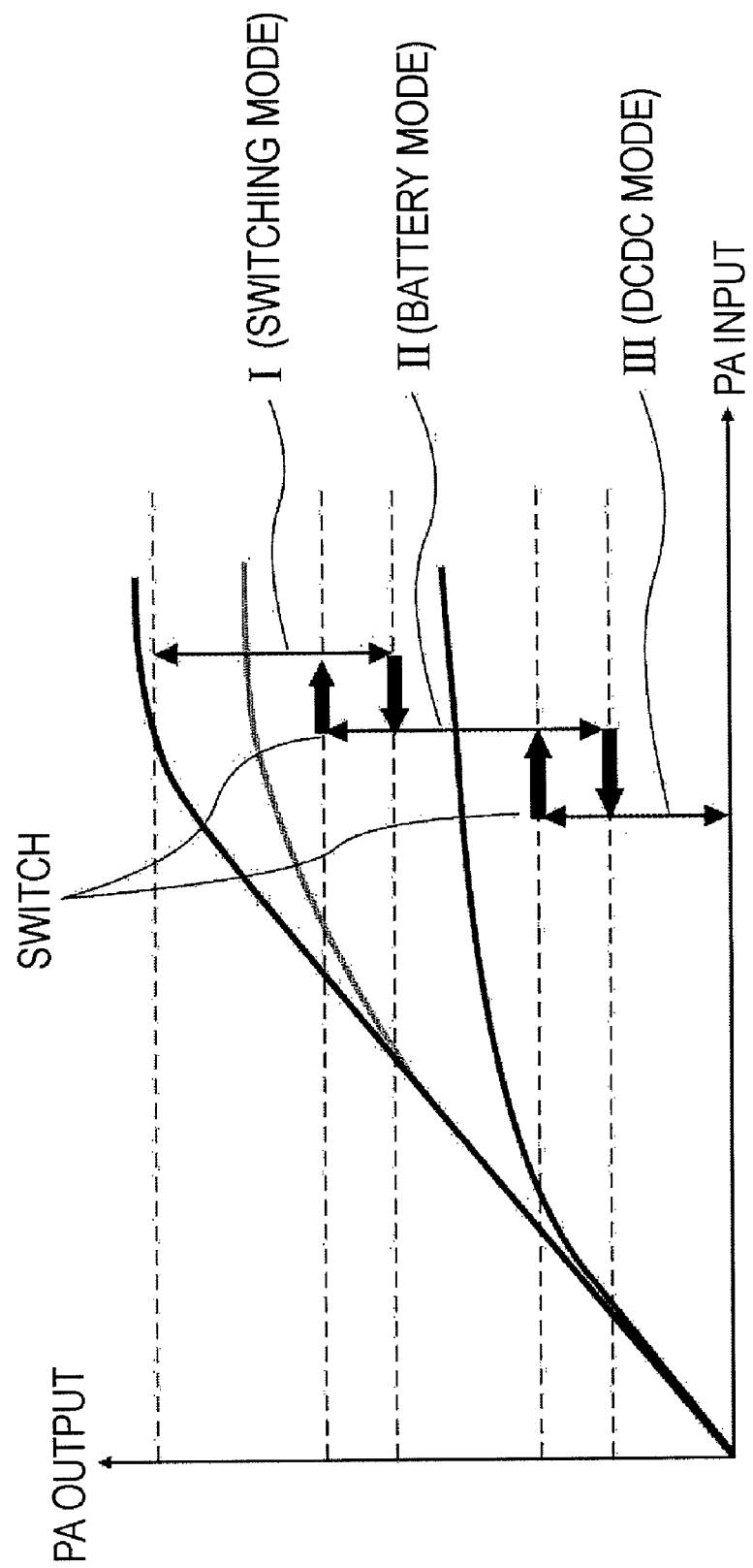
FIG. 15 illustrates a graph illustrating operations according to the seventh embodiment of the present invention.

That is, as shown in the graph of PA input versus PA output in FIG. 15, for PAVcc, the switching mode is set in the range I of the power level necessary for the power-supply voltage of Vbat+Vcharge, and the battery mode is set in the range II of the output power level at which operation is possible with only Vbat. Furthermore, the DC-DC mode is set in the range III of the output power level at which operation is possible at a voltage lower than Vbat. The switching of modes based on the power level is performed with a hysteresis with two threshold values for the switching between the respective ranges so that an unstable switching does not occur.

Although the preferred embodiments of the present invention have been described above, in addition to those embodiments described above, various modifications and changes can be made. For example, as an example of a load that is intermittently operated by using a battery as a power supply, a power amplifier is given, but the embodiment of the present invention is not limited to this. Furthermore, for the wireless communication apparatus, an example of a mobile phone terminal is given, but the embodiment of the present invention is not limited to this.

The present application contains subject matter related to that disclosed in Japanese Priority Patent Application JP 2008-287463 filed in the Japan Patent Office on Nov. 10, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A wireless communication apparatus comprising:
   a power-supply apparatus configured to supply electric power to a load that is intermittently operated by using a battery as a power supply; and
   control means for controlling the power-supply apparatus, wherein the power-supply apparatus includes
      a capacitor;
      switching means capable of selectively forming a first path through which charging is performed from the battery to the capacitor and a second path through which the battery is connected in series with the capacitor; and
      a zener diode connected in parallel to the capacitor, the zener diode having an anode connected to the first path and a cathode connected to the second path,
   wherein the control means controls the switching means so that the first path is formed during a period in which the load is idle and the second path is formed during a period in which the load is not idle, and therein supplies the voltage of the sum of the battery voltage and the charged voltage of the capacitor in a non-idle period.

2. The wireless communication apparatus according to claim 1, wherein the switching means includes
   first and second switches that are connected between an output end of the battery and a ground and that are turned on/off in a complementary manner, and
   a third switch that selectively connects the output end of the battery to one end of the capacitor, and
   wherein the other end of the capacitor is connected to a connection point of the first and second switches.

3. The wireless communication apparatus according to claim 1, wherein the load that is intermittently operated is a power amplifier for use in a communication device employing a time-division multiplexing method.

4. The wireless communication apparatus according to claim 3, wherein the control means includes
   a controller configured to selectively enable the power amplifier and generate a first control signal for controlling the first and second switches, and
   a capacitor voltage monitoring unit configured to monitor an output voltage of the capacitor and generate a second control signal for controlling the third switch on the basis of the monitoring result.

5. The wireless communication apparatus according to claim 4, wherein, in response to power control of the power amplifier, the control means turns off the first switch, turns on the second switch, and turns on the third switch in the range of an output power level at which operation is possible with only the battery voltage, therein applying battery output to the power amplifier regardless of whether or not the load is in an idle period.

6. The wireless communication apparatus according to claim 4, further comprising a battery voltage monitoring unit configured to monitor a battery voltage,
   wherein the control means turns off the first switch, turns on the second switch, and turns on the third switch when the battery voltage is higher than or equal to a predetermined voltage so as to apply battery output to the power amplifier regardless of whether or not the load is in an idle period.

7. The wireless communication apparatus according to claim 6, wherein the control means further includes a function of adjusting a charged voltage of the capacitor in accordance with a variation in the battery voltage by controlling the battery voltage monitoring unit and the capacitor voltage monitoring unit so that the sum of the battery voltage and the charged voltage of the capacitor becomes constant.

8. The wireless communication apparatus according to claim 1, wherein the zener diode protects the capacitor.

9. The wireless communication apparatus according to claim 1, wherein the zener diode having an ON voltage higher than or equal to an upper limit of an operating voltage of the load and the ON voltage is lower than or equal to a maximum rating of the capacitor.

10. The wireless communication apparatus according to claim 2, wherein the zener diode having the cathode connected to the third switch and the anode connected to the connection point of the first and second switches.

11. A power-supply apparatus for supplying electric power to a load that is intermittently operated by using a battery as a power supply, the power-supply apparatus comprising:
    a capacitor;
    switching means capable of selectively forming a first path through which charging is performed from the battery to the capacitor, and a second path through which the battery is connected in series with the capacitor; and
    a zener diode connected in parallel to the capacitor, the zener diode having an anode connected to the first path and a cathode connected to the second path,
    wherein the switching means is controlled in such a manner that the first path is formed during a period in which the load is idle and the second path is formed during a period in which the load is not idle, therein supplying a voltage of the sum of the battery voltage and the charged voltage of the capacitor to the load during a non-idle period.

12. A power-supply apparatus according to claim 11, wherein the load that is intermittently operated is a power amplifier for use in a communication device employing a time-division multiplexing method.

13. A wireless communication apparatus comprising:
    a power-supply apparatus configured to supply electric power to a load that is intermittently operated by using a battery as a power supply; and
    a control unit configured to control the power-supply apparatus,
    wherein the power-supply apparatus includes
       a capacitor;

a switching unit capable of selectively forming a first path through which charging is performed from the battery to the capacitor and a second path through which the battery is connected in series with the capacitor; and a zener diode connected in parallel to the capacitor, the zener diode having an anode connected to the first path and a cathode connected to the second path, wherein the control unit controls the switching unit so that the first path is formed during a period in which the load is idle and the second path is formed during a period in which the load is not idle, and therein supplies the voltage of the sum of the battery voltage and the charged voltage of the capacitor in a non-idle period.

14. A power-supply apparatus for supplying electric power to a load that is intermittently operated by using a battery as a power supply, the power-supply apparatus comprising:

a capacitor;

a switching unit capable of selectively forming a first path through which charging is performed from the battery in the capacitor, and a second path through which the battery is connected in series with the capacitor; and zener diode connected in parallel to the capacitor, the zener diode having an anode connected to the first path and a cathode connected to the second path, wherein the switching unit is controlled in such a manner that the first path is formed during a period in which the load is idle and the second path is formed during a period in which the load is not idle, therein supplying a voltage of the sum of the battery voltage and the charged voltage of the capacitor to the load during a non-idle period.

* * * * *